Patented Oct. 26, 1926.

1,604,887

UNITED STATES PATENT OFFICE.

RICHARD LANT, OF VIENNA, AUSTRIA, ASSIGNOR, BY MESNE ASSIGNMENTS, TO D. GESTETNER, LIMITED, OF LONDON, ENGLAND, A CORPORATION.

STENCIL SHEET.

No Drawing. Original application filed November 16, 1922, Serial No. 601,415, and in Austria October 11, 1922. Divided and this application filed December 21, 1923. Serial No. 682,090.

The present application is a division of my copending application, Serial No. 601,415, filed November 16, 1922, for "stencil sheet".

According to my invention the manufacturing of a protein stencil sheet, which without being hygroscopic or including water and without preliminary moistening can be used in a perfectly dry state for preparing the stencil, is realized by adding to the coating mass esters of high molecular weight to such an amount, that in preparing the stencil in the typewriting machine by the impact of the type only those parts of the coating mass are removed, which are directly struck by the protruding lines of the steel type forming the characters, whilst the interstitial spaces bordered all around by the lines forming the characters will not be stamped out. Of the substances appropriate for such additions may by way of examples be named: fatty substances or similar esters of high molecular weight, oils and different kinds of wax. For obtaining stencil sheets efficiently operating without moistening the substances adapted for diminishing the brittleness of the dry coagulated protein by their own efficiency have to amount to many times the weight of the protein contained in the coating mass. If the chosen substance to be added is soluble in a solvent, which is also capable of dissolving the protein, the dissolving is done simultaneously in one operation, otherwise the substance is added to the solution of the protein in the form of an emulsion or of a suspension or of a colloidal solution. The coating of the open porous base, preferably paper, is effected either by dipping it into the mixed solution or else by spreading the solution on it by means of a brush or sponge, or in other known manner.

After the coating has been dried, the sheet is drawn through a strong solution of formaldehyde for the purpose of coagulating the protein and then dried again.

Where in the appended claims the term "oleaginous" is used, it is employed as denoting bodies of an oily or unctuous character.

What I claim is:

1. A stencil sheet comprising a base of open porous material coated with a composition substantially free from water and hygroscopic materials, consisting essentially of a gelatinized organic colloid deposited from an aqueous medium and a fatty acid ester of high molecular weight and of an oleaginous character, said ester being present in a proportion sufficient to maintain the composition permanently in a state in which it may be stencilized when substantially free from moisture.

2. A stencil sheet comprising a base of open porous material coated with a composition consisting essentially of a protein and a fatty acid ester of high molecular weight and of an oleaginous character, said ester being present in a proportion sufficient to maintain the composition permanently in a state in which it may be stencilized when substantially free from moisture.

3. A stencil sheet comprising a base of open porous material coated with a composition consisting essentially of an emulsion of a gelatinized organic colloid deposited from an aqueous medium and an oleaginous fatty acid ester in a proportion sufficient to maintain the composition permanently in a state in which it may be stencilized when substantially free from moisture.

4. A stencil sheet comprising a base of open porous material coated with a composition consisting essentially of an emulsion of a gelatinized protein and an oleaginous fatty acid ester in a proportion sufficient to maintain the composition permanently in a state in which it may be stencilized when substantially free from moisture.

5. A stencil sheet comprising a base of open porous material coated with a composition consisting essentially of a coagulated protein and an oleaginous ester of a fatty acid, said oleaginous ester being present in a proportion sufficient to maintain the composition permanently in a state in which it may be stencilized when substantially free from moisture.

6. A stencil sheet comprising a base of open porous material coated with a composition substantially free from water and hygroscopic material and containing a gelatinized organic colloid deposited from an aqueous medium and a proportion of an oleaginous fatty acid ester adapted to diminish the brittleness of the gelatinized colloid and maintain permanently the stencil sheet in a condition in which it may be stencilized by pressure or impact without the application of moisture.

7. A process for the manufacture of stencil sheets adapted for stencilization by pressure comprising coating a base of open porous material with a composition consisting essentially of a gelatinizing organic colloid solated in an aqueous medium and a proportion of a fatty acid ester of high boiling point sufficient to maintain the composition permanently in a state in which it may be stencilized when substantially free from moisture, and rendering the coating composition substantially air dry.

8. The process for the manufacture of stencil sheets adapted for stencilization by pressure which comprises coating a base of open porous material with a composition consisting essentially of a protein solated in an aqueous medium and a proportion of an oleaginous fatty acid ester material of high boiling point, sufficient to maintain the composition permanently in a state in which it may be stencilized when substantially free from moisture, and rendering the coating composition substantially air dry.

9. The process for the manufacture of stencil sheets adapted for stencilization by pressure in a dry state which comprises coating a base of open porous material with an aqueous disperse system including a protein and glycerides of fatty acids in a state of colloidal dispersion, said glycerides of fatty acids being present in a proportion sufficient to maintain the composition permanently in a state in which it may be stencilized when substantially free from moisture, drying the coating and hardening the protein.

10. The process for the manufacture of stencil sheets adapted for stencilization by pressure in a dry state which comprises coating a base of open porous material with an aqueous disperse system including a gelatinizing organic colloid and an oil in a state of colloidal dispersion, such composition being substantially free from hygroscopic substances and drying the coating.

In testimony whereof I have affixed my signature.

RICHARD LANT.